(12) United States Patent
Fodor et al.

(10) Patent No.: US 11,477,821 B2
(45) Date of Patent: Oct. 18, 2022

(54) UPLINK TRANSMISSIONS IN A WIRELESS COMMUNICATIONS NETWORK

(71) Applicant: Telefonaktiebolaget LM Ericsson (publ), Stockholm (SE)

(72) Inventors: Gabor Fodor, Hässelby (SE); Per Skillermark, Årsta (SE); Osama Al-Saadeh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 16/954,661

(22) PCT Filed: Dec. 20, 2017

(86) PCT No.: PCT/SE2017/051321
§ 371 (c)(1),
(2) Date: Jun. 17, 2020

(87) PCT Pub. No.: WO2019/125252
PCT Pub. Date: Jun. 27, 2019

(65) Prior Publication Data
US 2020/0314904 A1    Oct. 1, 2020

(51) Int. Cl.
*H04W 74/08* (2009.01)
*H04B 7/0452* (2017.01)
(Continued)

(52) U.S. Cl.
CPC ...... *H04W 74/0808* (2013.01); *H04B 7/0452* (2013.01); *H04B 7/063* (2013.01); *H04W 16/14* (2013.01)

(58) Field of Classification Search
CPC .................. H04B 7/06; H04W 16/14
See application file for complete search history.

(56) References Cited

U.S. PATENT DOCUMENTS

2005/0195784 A1    9/2005    Freedman et al.
2007/0223402 A1    9/2007    Waxman
(Continued)

FOREIGN PATENT DOCUMENTS

EP    1686701 A1    8/2006

OTHER PUBLICATIONS

PCT International Search Report and Written Opinion dated Nov. 12, 2018 for International Application PCT/SE2017/051321, 10 pages.

(Continued)

*Primary Examiner* — Sulaiman Nooristany
(74) *Attorney, Agent, or Firm* — Sage Patent Group

(57) ABSTRACT

A method performed by a station for enabling an Uplink, UL, transmission to an access point in a wireless communications network is provided. The station determines a UL transmission rank for an UL transmission to the access point. Then, the station transmits, to the access point, a message on a contention-based transmission resource in the wireless communications network comprising information indicating the determined UL transmission rank. A station for enabling an UL transmission to an access point in a wireless communications network is also provided. Furthermore, an access point and a method performed therein for enabling an UL transmission from a station in a wireless communications network are also provided.

22 Claims, 9 Drawing Sheets

(51) Int. Cl.
  *H04B 7/06* (2006.01)
  *H04W 16/14* (2009.01)

(56) References Cited

U.S. PATENT DOCUMENTS

2012/0134441 A1* 5/2012 Yokomakura .......... H04B 7/063
                                                    375/295
2019/0059001 A1* 2/2019 Yerramalli ........ H04W 72/0413
2020/0228266 A1* 7/2020 Kim ........................ H04B 7/06

OTHER PUBLICATIONS

Yin et al., A Coordinated Approach to Channel Estimation in Large-scale Multiple-Antenna Systems, IEEE Journal on Selected Areas in Communications, vol. 31, No. 2, Feb. 2013, pp. 264-273.
Moghadam et al., "Pilot Precoding and Combining in Multiuser MIMO Networks", IEEE International Conference on Acoustics, Speech and Signal Processing (ICASSP), 2017, pp. 3544-3548.
Messer et al., "Simultaneous Spatial Separation and Directional of Arrival Estimation of Wideband Sources Using Bootstrapped Algorithms", IEEE Transactions on Circuits and Systems-II: Analog and Digital Signal Processing, vol. 43, No. 4, Apr. 1996, pp. 316-328.

* cited by examiner

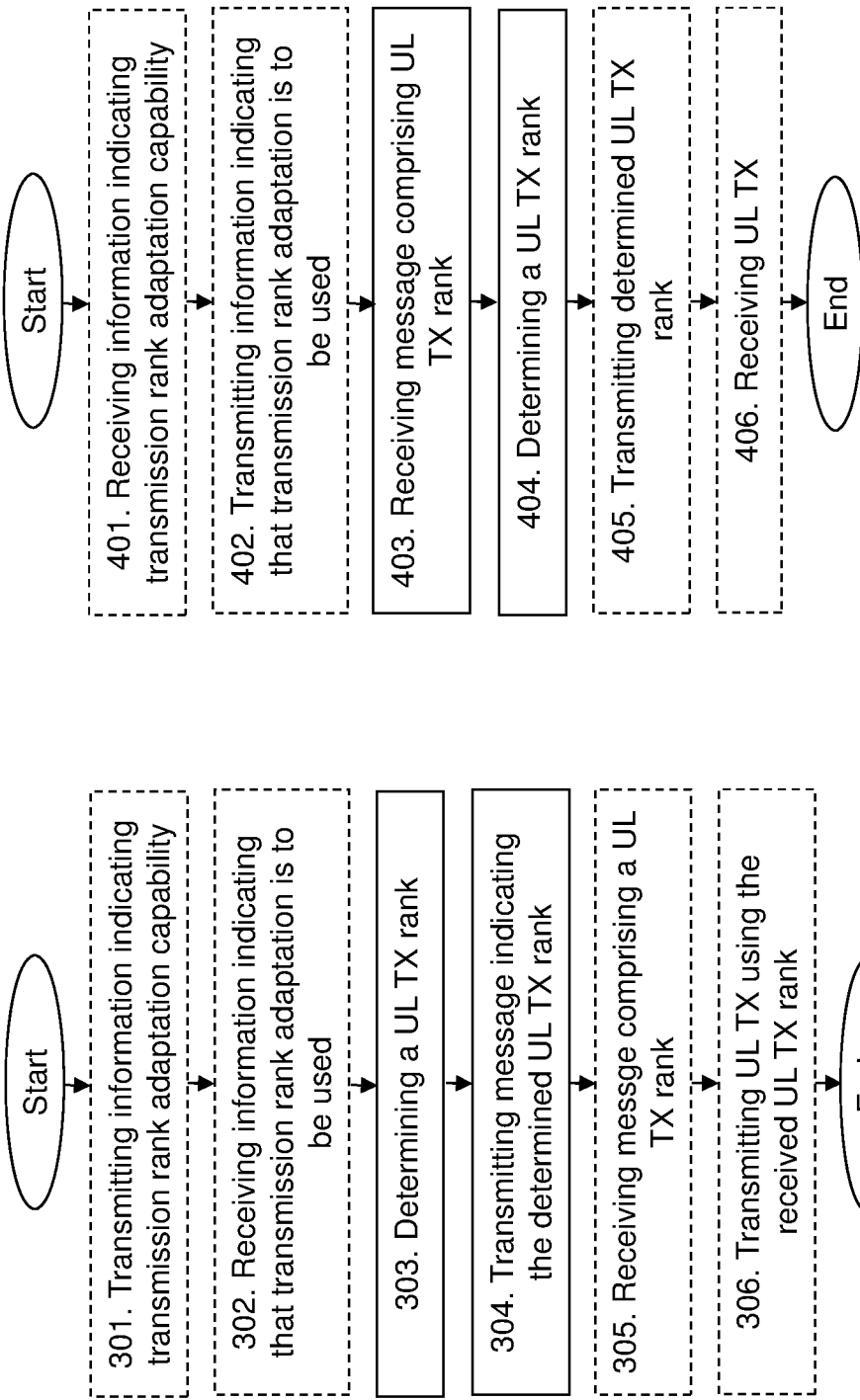

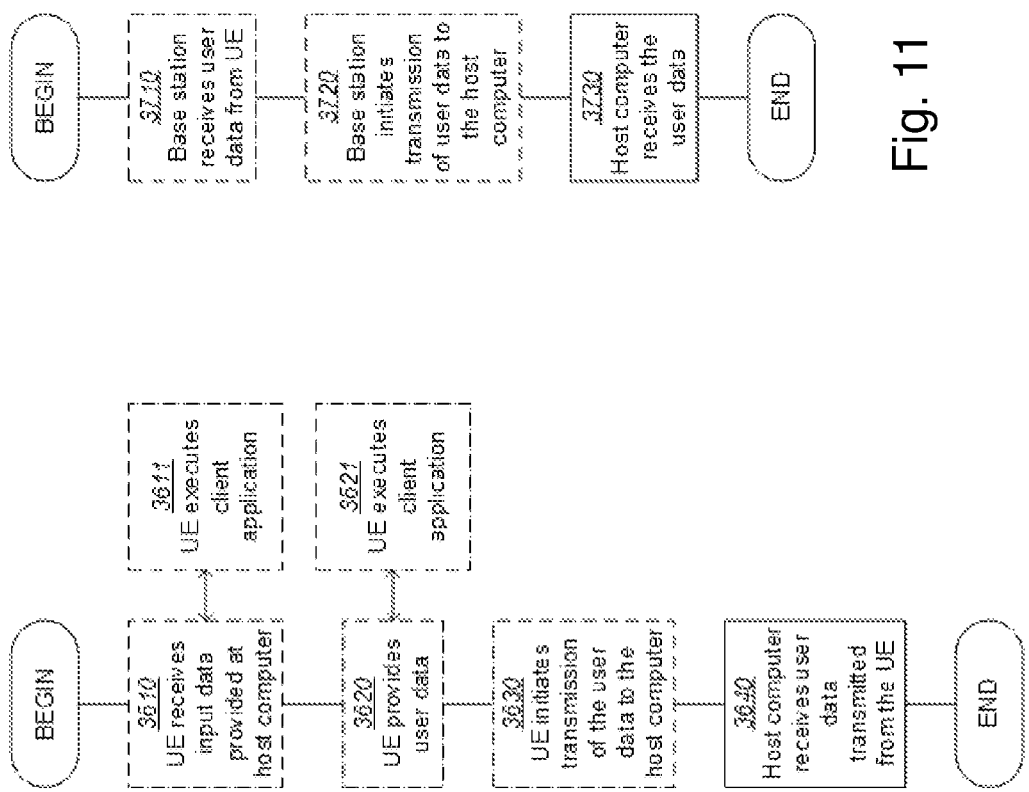

UPLINK TRANSMISSIONS IN A WIRELESS COMMUNICATIONS NETWORK

CROSS-REFERENCE TO RELATED APPLICATIONS

This application is a 35 U.S.C. § 371 national stage application for International Application No. PCT/SE2017/051321, entitled "UPLINK TRANSMISSIONS IN A WIRELESS COMMUNICATIONS NETWORK", filed on Dec. 20, 2017, the disclosures and contents of which are hereby incorporated by reference in their entireties.

TECHNICAL FIELD

Embodiments herein relate to transmissions in a wireless communications network. In particular, embodiments herein relate to a station and a method therein for enabling an uplink transmission to an access point in a wireless communications network. Also, embodiments herein further relates to an access point and method therein for enabling an uplink transmission from a station in a wireless communications network.

BACKGROUND

One example of a wireless communications network using contention-based transmission resources is the standardized IEEE 802.11 Wireless LAN, WLAN. Here, a Basic Serving Set, BSS, is regarded the basic building block of the wireless communications network. The BSS comprise an Access Point, AP, and a number of stations, STAs, located within a certain coverage area or cell being served by the AP. The STAs transmit data over an air or radio interface to the AP in Uplink, UL, transmissions and the APs transmit data over an air or radio interface to the STAs in Downlink, DL, transmissions.

Within a BSS, the transmissions between the AP and the STAs is typically performed in a distributed manner. This means that before a transmission, a STA first performs a sensing of the transmission medium for a specific period of time, e.g. a Clear Channel Assessment, CCA. If the transmission medium is deemed idle, e.g. received signal power is below a threshold, then access is assigned to this STA for transmission. On the other hand, if the transmission medium is deemed occupied, e.g. received signal power is above the threshold, the STA typically has to wait a random back-off period and then again check whether the transmission medium is idle or occupied. For example, according to the current standard, the threshold is −82 dBm. The random back-off period provides a collision avoidance mechanism for multiple STAs that wish to transmit in the same BSS. Generally, contention-based channel access is commonly referred to as Carrier Sense, CS, or Listen-Before-Talk, LBT, and systems employing this type of channel access may be referred to as carrier sensing networks.

However, in many cases, there still exists STAs or APs that do not hear each other, e.g. the received signal power is too low, and will hence attempt to send their data simultaneously causing collisions at the receiver and hence cause data packet loss. This is commonly referred to as the hidden node problem. Another issue in these types of systems is that a STA may refrain from transmitting to a AP due to sensing the transmission medium as busy, although the AP does not experience any interference from another STA or AP. This may occur when the another STA or AP is close to the STA, even though the intended receiver of their transmission are well separated in space. This is commonly referred to as the exposed node problem.

To avoid this type of collisions or unwarranted back-offs, a medium access protocol comprising Request-to-Send, RTS, transmissions and Clear-to-Send, CTS, transmission has been proposed in the IEEE 802.11 WLAN standard. Although the procedure according to this RTS/CTS medium access protocol may not completely eliminate the hidden/exposed node problems, it reduces the packet collision probability and unnecessary deferrals in the system and is widely used in carrier sensing networks. The procedure is illustrated in FIG. 1 and described below with reference thereto.

According to the procedure, a first station STA #1 having data to transmit may first send an RTS message to the intended receiver, in this case, an AP, in a first time slot. This assumes that the first station STA #1 has monitored and sensed the carrier medium as not busy. In response to the RTS message, the AP sends a Clear-to-Send, CTS, message back to the STA #1 in a subsequent time slot. Since both the first station STA #1 and a second station STA #2 are constantly scanning the carrier medium for CTS messages, this CTS message may be received by both the first station STA #1 and a second station STA #2. Upon receiving the CTS message, the first station STA #1 may transmit its data to the AP in following one or more time slots. The second station STA #2, and all other STAs or APs in the BSS that are able to receive or hear the CTS message from the AP, will respond by deferring its own data transmissions for a determined period of time. This determined period of time may be fixed or included in a field in the CTS message. This is shown in FIG. 1 by the second station STA #2 deferring its transmission of data that it wants to transmit after having received the CTS from the AP intended for the first station STA #1.

Upon the expiry of the deferral period, the second station STA #2 may sense that the carrier medium is no longer busy and send a RTS message to the AP. Similarly as for the first station STA #1, the AP may send a CTS message back to the STA #2 in response to the RTS message in a subsequent time slot. In this case, the first station STA #1 may defer its own data transmissions for a determined period of time, while the second station STA #2 may transmit its data to the AP in the following one or more time slots. Hence, as seen in FIG. 1, this basic procedure according to this RTS/CTS medium access protocol facilitates "conflict-free" time sharing of the carrier medium, i.e. the radio transmission resources, in a carrier sensing network.

Furthermore, to further improved the RTS/CTS medium access protocol, support for Request-for-Request-To-Send, RRTS, messages may be added. In this case, a potential receiver that has not responded with a CTS message in view of several RTS messages from a potential transmitter may use an RRTS message to notify the transmitter about a transmission opportunity. Thus, the potential receiver may help the potential transmitter to know when sending an RTS message has a high probability to result in a CTS message from the potential receiver.

Support for the standardized IEEE 802.11 Wireless LAN, WLAN, is commonly also implemented in wireless devices further capable of operating in other wireless communications networks. These other wireless communications networks, or cellular/mobile communication networks, may use a number of different technologies, such as 5G/New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. In this case, the wireless communications network may comprise radio base stations providing radio coverage over at least one respective geographical area forming a cell. Wireless devices, which also may be referred to as User Equipments, UEs, mobile stations, and/or wireless terminals, are served in the cells by the respective radio base station.

One important difference from WLAN networks is that these wireless communications networks do not primarily operate using contention-based transmission resources, i.e. operate within the so-called unlicensed frequency spectrum, but in the licensed, scheduled part of the frequency spectrum. The unlicensed frequency spectrum may refer to parts of spectrum comprising unlicensed frequency bands which are shared, decentralized and not licensed to a particular type of scheduled wireless or radio communication.

Although, it should be noted that functionality has been introduced in these wireless communication network in order to support so-called Licensed Assisted Access, LAA. LAA allows cellular network operators to offload some of their data traffic by accessing the unlicensed frequency bands. However, in order to access the unlicensed frequency bands, the LAA cell must adhere to the carrier sensing or Listen-Before-Talk, LBT, mechanism for these contention-based transmission resources as described above.

Since LAA may add significantly improved performance and data rates to these wireless communications networks, there is a constant need to improve the co-existence of these two wireless communication networks, as well as, improving the procedures or protocols used therein.

SUMMARY

It is an object of embodiments herein to improve transmissions in a wireless communications network.

According to a first aspect of embodiments herein, the object is achieved by a method performed by a station for enabling an Uplink, UL, transmission to an access point in a wireless communications network. The station determines an UL transmission rank for an UL transmission to the access point. The station also transmits, to the access point, a message on a contention-based transmission resource in the wireless communications network comprising information indicating the determined UL transmission rank.

According to a second aspect of embodiments herein, the object is achieved by a station for enabling an UL transmission to an access point in a wireless communications network. The station is configured to determine an UL transmission rank for an UL transmission to the access point. The station is further configured to transmit, to the access point, a message on a contention-based transmission resource in the wireless communications network comprising information indicating the determined UL transmission rank.

According to a third aspect of embodiments herein, the object is achieved by a method performed by an access point for enabling an UL transmission from a station in a wireless communications network. The access point receives, from the station, a message on a contention-based transmission resource in the wireless communications network comprising information indicating a UL transmission rank for an UL transmission from the station. The access point also determines an UL transmission rank for an UL transmission from the station based on at least the UL transmission rank received from the station. Further, the access point transmits, to the station, a message on a contention-based transmission resource in the wireless communications network comprising information indicating the determined UL transmission rank.

According to a fourth aspect of embodiments herein, the object is achieved by an access point for enabling an UL transmission from a station in a wireless communications network. The access point is configured to receive, from the station, a message on a contention-based transmission resource in the wireless communications network comprising information indicating a UL transmission rank for an UL transmission from the station. Also, the access point is configured to determine an UL transmission rank for an UL transmission from the station based on at least the UL transmission rank received from the station. Further, the access point is configured to transmit, to the station, a message on a contention-based transmission resource in the wireless communications network comprising information indicating the determined UL transmission rank.

According to a fifth aspect of the embodiments herein, computer programs are also provided configured to perform the methods described above. Further, according to a sixth aspect of the embodiments herein, carriers are also provided configured to carry the computer programs configured for performing the methods described above.

By having a station suggest an UL transmission rank of an UL transmission on contention-based resources in a wireless communication network to an access point, the access point is able to review its current capabilities to receive the UL transmission from the station using the suggested UL transmission rank and, based thereon, determine a UL transmission rank that the station is to use for the UL transmission on contention-based resources in a wireless communication network to the access point and transmit this decision to the station. This advantageously enable multiple stations to simultaneously transmit to the access point over contention-based transmission resources without causing interference for each others transmissions at the access point. A further advantage, in reference to the exposed node problem described above, a station may still proceed with its UL transmission to the access point even though sensing another station occupying the contention-based transmission resources in its vicinity, since the access point has already accounted for the interference from the other station when determining the transmission rank for the UL transmission from the station. Hence, this UL transmission rank adaptation will improve transmissions in a wireless communications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 3 is a flowchart depicting embodiments of a method in a station, FIG. 4 is a flowchart depicting embodiments of a method in an access point, FIGS. 10-11 are flowcharts illustrating methods implemented in a communication system including a host computer, a base station and a user equipment.

DETAILED DESCRIPTION

Figure 1:
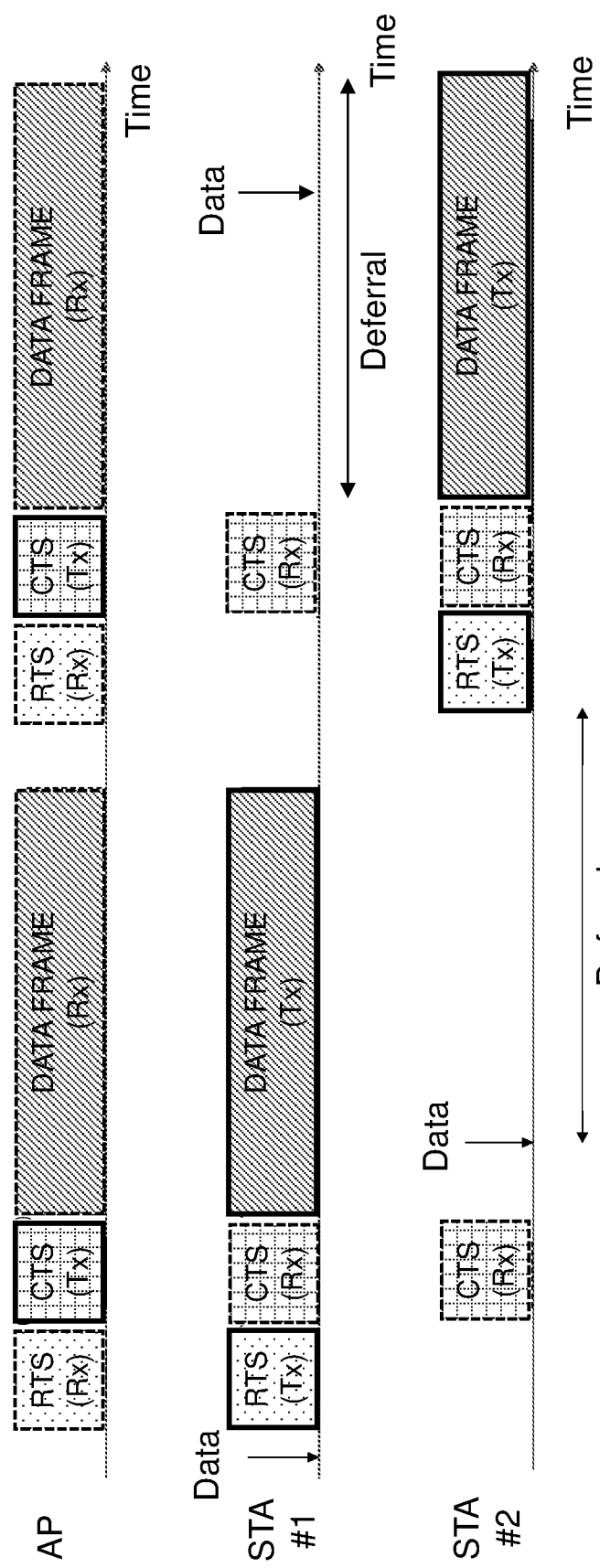
FIG. 1 is a schematic illustration of conventional RTS/CTS signalling in a wireless communications network.

The figures are schematic and simplified for clarity, and they merely show details which are essential to the understanding of the embodiments presented herein, while other details have been left out. Throughout, the same reference numerals are used for identical or corresponding parts or steps.

Figure 2:
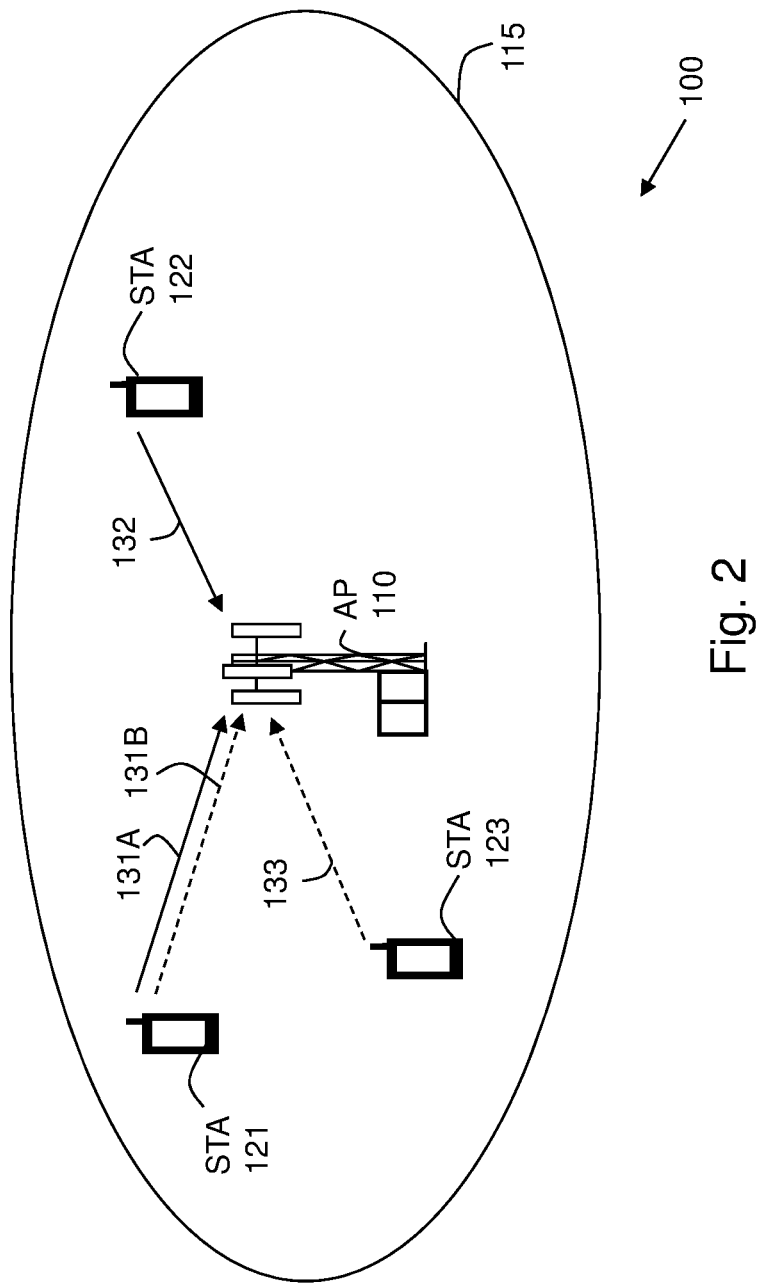
FIG. 2 is a schematic block diagram illustrating embodiments of a station and an access point in a wireless communication network.

FIG. 2 shows an example of a wireless communications network 100 in which embodiments herein may be implemented. The wireless communications network 100 illustrated in FIG. 2 may be any wireless communications network capable of using contention-based transmission resources, such as, e.g. a standardized IEEE 802.11 WLAN or a cellular or radio communication system capable of using contention-based transmission resources, e.g. for LAA operations. For the latter, the cellular or radio communication system may operate in parts of the so-called unlicensed spectrum, i.e. unlicensed frequency bands which are shared, decentralized and not licensed to a particular type of scheduled wireless or radio communication. Examples of such wireless or radio communication systems may comprise 5G/New Radio (NR), LTE, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system.

The wireless communications network 100 may comprise an access point, AP 110. The access point AP 110 may serve stations, i.e. wireless devices, located within their respective coverage area or cell 115. While the access point AP 110 may be an access point in a WLAN network, the access points AP may also, for example, be a gNB, eNB, eNodeB, or a Home Node B, a Home eNode B, femto Base Station (BS), pico BS or any other network unit capable to serve stations in the wireless communications network 100. The access point AP 110 may also be e.g. a radio base station, a base station controller, a network controller, a relay node, a repeater, a Ultra-Dense Network/Software-Defined Network (UDN/SDN) radio access node, a Remote Radio Unit (RRU) or a Remote Radio Head (RRH). According to embodiments herein, the access point AP 110 comprise multiple antennas and is capable of serving one or more stations for Uplink Multi-User Multiple Input Multiple Output, UL MU MIMO, transmissions in a cellular or radio communication system. This means that the access point AP 110 may receive multiple transmission streams simultaneously from multiple stations in the wireless communications network 100. It may here be noted that when multiple antennas are deployed in an access point, the vector channel for a single antenna station tends to become close to orthogonal to the vector channel of a randomly selected interfering station. This orthogonality characteristics of vector channels may be utilized to co-schedule multiple stations for simultaneous uplink transmissions. This may commonly be referred to as UL MU MIMO. Furthermore, it has also been noted that transmissions in a UL MU MIMO system may be separated in the spatial domain as long as the stations exhibits multipath Direction-of-Arrival or Angle-of-Arrival, DoAs/AoA, domains that do not overlap. In fact, separating the stations spatially is also possible if the AoA of the dominant paths of the stations overlap only with multipath components that carry a relatively small part and negligible portion of the signal energy.

In the example scenarios shown in FIG. 2, a first station STA 121, a second station STA 122 and a third station STA 123 are located in the coverage area or cell of the access point AP 110 and may thus be served by the access point AP 110. The access point AP 110 and the first, second and third stations STA 121, 122, 123 may be said to comprise a Basic Service Set, BSS. It should be noted that in case BSS overlaps another BSS using the same frequency/channel, then these may be referred to as an Overlapping BSS, OBSS. Furthermore, in some embodiments, each of the first, second and third station STA 121, 122, 123 may e.g. be any kind of wireless device such as a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, D2D capability, a wireless device with D2D capability, a Customer-Premises Equipment (CPE), a Laptop-Mounted Equipment (LME), a Laptop-Embedded Equipment (LEE), etc.

According to embodiments herein, each of the first, second and third station STA 121, 122, 123 may comprise one, two or more antennas capable of transmitting and/or receiving multiple data streams or symbols simultaneously in a cellular or radio communication system. By having multiple antennas, the first, second and third station STA 121, 122, 123 enable multiple antenna transmission schemes, such as, e.g. UL beamforming of reference and data transmission. This means that the access point AP 110 may exploit the signal characteristics of the beamformed UL transmissions from the first, second and third station STA 121, 122, 123 in its receiver algorithm to improve the effective Signal-to-Interference-plus-Noise ratio, SINR, and rate performance when co-scheduling UL MU MIMO stations for simultaneous transmission. The multiple antennas of the first, second and third station STA 121, 122, 123 may also be used to increase the UL data rate, especially in favourable SINR conditions, by using multi-stream scheduling. That is, the multiple antennas of the first, second and third station STA 121, 122, 123 may be used to transmit multiple symbols, or code words, that are separated in the spatial domain.

Furthermore, although embodiments below are described with reference to FIG. 2, this should not be construed as limiting to the embodiments herein, but merely as an example made for illustrative purposes.

As part of the developing of the embodiments described herein, it has been realized that there may be situations in which existing procedures or schemes used for operating APs and STA on contention-based transmission resources may be improved.

One such example found in the case when the access point AP 110 is capable of serving one or more stations or wireless devices for Uplink Multi-User Multiple Input Multiple Output, UL MU MIMO, transmissions, and the first, second and third stations STA 121, 122, 123 each comprise one, two or more antennas capable of transmitting and/or receiving multiple data streams or symbols simultaneously. Here, it has further been realized that multiple antenna reception techniques may enable the access point AP 110 to simultaneously receive multiple spatial streams due to the spatial separability. This is illustrated in the example scenarios shown in FIG. 2.

These example scenarios illustrates a first situation where the first station STA 121 and the second station 122 may be co-scheduled with different transmission ranks due to, for example, prevailing channel conditions, capabilities at the stations and available Degree-of-Freedom, DoF, of multiple antennas at the access point AP 110. For example, the first station STA 121 may be assigned a Rank 2 transmission 131A-131B simultaneously as the second station STA 122 is assigned a Rank 1 transmission 132 on the same contention-based transmission resources. However, it is also illustrated in these example scenarios a second situation where a third station STA 123 is present, in this case the first station STA 121 and the third station STA 123 may be co-scheduled only with low transmission ranks, e.g. the first station STA 121 with a Rank 1 transmission 131A and the third stations STA 123 with a Rank 1 transmission 133. This may be because the first station STA 121 and the third station STA 123, for example, may have overlapping Angle-of-Arrival, AoA, domains. In other words, it is shown in FIG. 1 that a first station STA 121 may advantageously use higher rank transmissions during favourable channel conditions and when the AP 110 has enough DoF, i.e. the number of antennas at the access point AP 110 that may be used for the reception of uplink data streams of the first station STA 121, in addition to other, already in-progress uplink data streams from other stations, such as, e.g. the second and third stations STA 122, 123. In contrast, lower rank transmission may be advantageously used in unfavourable conditions, e.g. when having a low Signal-to-Noise Ratio, SINR, or when the access point AP 110 is serving other stations and have less DoF for the reception of data streams from the first station STA 121. In conclusion, this means that the first station STA 121 should use different uplink transmission parameters, i.e. a different transmission rank, depending on the different scenarios shown in FIG. 2. One issue in this case is then how to determine the transmission rank of an UL transmission at the first station STA 121 when transmitting the UL transmission to the AP 121 over contention-based transmission resources.

This issue is address by the embodiments herein in that the first station STA 121 is configured to suggest an UL transmission rank for an UL transmission to the access point AP 110, wherein the access point AP 110 is able to review its current capabilities to receive the UL transmission from the first station STA 121 using at least the suggested UL transmission rank and determine an UL transmission rank that the first station STA 121 is to use for the UL transmission to the access point AP 110 and transmit this decision to the first station STA 121.

This advantageously enables the first station STA 121 to perform transmissions to the access point AP 110 over contention-bases transmissions resources simultaneously with multiple other stations, such as, the second and third stations STA 122, 123, in the wireless communications network 100 without causing interference to each other at the access point AP 110. More, specifically the first station STA 121 is able to decide when to transmit and how to properly configure its transmit parameters, in particular its transmission rank, for UL transmission on contention-bases transmissions resources, thereby improving UL MU MIMO operations in the unlicensed frequency band.

In some embodiments, this means that, for example, the first station STA 121 may still go with its own UL transmission even in the presence of an interfering station for which it has received an intended CTS message. This is because the access point AP 110 may already have accounted for the interference situation in the UL transmission ranks decisions sent to each of the stations in the wireless communications network 100.

Embodiments of the first station STA 121, the access point AP 110 and methods therein will be described in more detail below with reference to FIGS. 3-11. It should be noted that the term contention-based transmission resources as used herein refers to time- and frequency resources capable of being used for data transmission in unlicensed frequency bands which are shared, decentralized and not licensed to a particular type of scheduled wireless or radio communication.

Further, the term transmission rank as used herein refers to an rank indication or indicator that may be used in selecting a suitable transmission layer or transmission mode for a data transmission, e.g. the rank indication or rank indicator may indicate the number of the antennas that a station may transmits with. Although, it should also be noted that the channel conditions may also affect the choice of the transmission rank, e.g. for good channel conditions with high SINR/SNR ratios, a higher transmission rank may be selected. In other words, the transmission rank may be considered to be the number of information-bearing complex symbols, also referred to as data symbols/streams or just symbols/streams, that a transmitter actually transmits; while, for example, the rank of a channel, i.e. the overall channel that specifies the channels between all transmitter and receiver antennas, is the rank of the channel matrix that characterizes that overall channel. The rank of the channel matrix is the maximum number of linearly independent rows and columns. This means that a transmitter may select a transmission rank that is, at most, equal to the rank of the channel. The rank of the channel may be limited by the smaller of the number of transmit antennas, the number of receive antennas, and the number of paths along the multipath connecting the transmitter and the receiver.

Example of embodiments of a method performed by a first station STA 121 for enabling an Uplink, UL, transmission to an access point AP 110 in a wireless communications network 100 will now be described with reference to the flowchart depicted in FIG. 3. FIG. 3 is an illustrated example of actions or operations which may be taken by the first station STA 121 in the wireless communication network 100.

Action 301

In this action, the first station STA 121 may, for example, transmit information to the access point AP 110 indicating that the first station STA 121 is capable of performing transmission rank adaptation for UL transmissions in the wireless communications network 100. This means that the first station STA 121 may notify the access point AP 110 that it is capable of performing transmission rank adaptation for UL transmission. This enables the access point AP 110 to control if and when the first station STA 121 is to perform transmission rank adaptation for UL transmission.

Action 302

Optionally, e.g. in response to the transmitted information in Action 301, the first station STA 121 may receive information from the access point AP 110 indicating that the first station STA 121 is to perform transmission rank adaptation for UL transmissions in the wireless communications network 100. This means that the first station STA 121 may receive a notification from the access point AP 110 that it should perform transmission rank adaptation for UL transmission, either from the access point AP 110 directly or as a response to the transmitted information in Action 301. Hence, the access point AP 110 may control if and when a first station STA 121 is to perform transmission rank adaptation for UL transmission.

Action 303

The first station STA 121 determines a UL transmission rank for an UL transmission to the access point AP 110.

According to some embodiments, the determined UL transmission rank may be based on at least Channel State Information, CSI, estimated from reference signals received from the access point AP 110, and the transmission information at the first station STA 121 associated with the number of antennas at the first station STA 121 which are available for transmitting an UL transmission to the access point AP 110. This may be performed fairly straight forward, since e.g. the higher the expected SINR is determined, based on the CSI, the higher the determined UL transmission rank.

It should be noted that in this case the transmission information may be the Degrees-of-Freedom, DoF, of the number of antennas at the first station STA 121 which are available for transmitting an UL transmission to the access point AP 110. In other words, the UL transmission rank may thus be limited by the DoF at the first station 121.

Action 304

After determining the UL transmission rank for the UL transmission in Action 303, the first station STA 121 transmits, to the access point AP 110, a message on a contention-based transmission resource in the wireless communications network 100 comprising information indicating the determined UL transmission rank. This may be advantageous, for example, in that the first station STA 121 may in this way request information from the access point AP 110 regarding, for example, whether or not it should use all of its available DoF, i.e. use its full DoF, for an UL transmission, or if it should use a lower DoF so that other stations also may perform UL transmission at the same time towards the same access point AP 110.

In some embodiments, the message from the access point AP 110 may be a Request-to-Send, RTS, message. This means that the RTS message according to the CS/LBT distributed MAC protocols, i.e. the RTS/CTS medium access protocol, may be extended such that the UL MU-MIMO transmission capabilities of the first station STA 121 and the access point AP 110 may be utilized. In this way, multiple stations in the wireless communications network 100 are enabled to be scheduled on the same contention-based transmission resource by making the RTS/CTS messages UL MU-MIMO compatible. The extended part of the RTS message may comprise the UL transmission rank determined in Action 303. This further means that the extended RTS message may be transmitted by the first station STA 121 on a contention-based transmission resource in the wireless communications network 100.

In some embodiments, the message to the access point AP 110 further comprises the transmission information at the first station STA 121. This means that the transmission information at the first station STA 121 associated with the number of antennas at the first station STA 121 which are available for transmitting an UL transmission to the access point AP 110 may be included in the message to the access point AP 110. This may, for example, be the Degrees-of-Freedom, DoF, of the number of antennas at the first station STA 121 which are available for transmitting an UL transmission to the access point AP 110. This may advantageously further assist the access point AP 110 in determining a suitable UL transmission rank for the UL transmission. This also means that the extended part of a RTS message may further comprise this transmission information.

In some embodiments, the transmission resources in the wireless communications network 100 over which the message is transmitted to the access point AP 110 are different than the ones over which an UL transmission from the first station STA 121 is transmitted to the access point AP 110. This means, for example, in case of using RTS/CTS messages and data frames, as illustrated e.g. in FIG. 5 below, that this RTS message will be transmitted over different transmission resources than the upcoming data frames. This may, for example, be performed so that the RTS messages do not interfere with any ongoing uplink data transmissions, and thus are easily detected at the access point AP 110. In this case, the different transmission resources may, for example, be different frequencies, time slots, or codes.

Action 305

Optionally, e.g. in response to the transmitted information in Action 304, the first station STA 121 may receive, from the access point AP 110, a message on a contention-based transmission resource in the wireless communications network 100 comprising information indicating a UL transmission rank to be used by the first station STA 121 in an UL transmission. This UL transmission rank may or may not be the same as the UL transmission rank that the first station STA 121 determined and transmitted in Actions 303-304 depending on the current reception capabilities and current situation at the access point AP 110.

In some embodiments, the message from the access point AP 110 may be a Clear-to-Send, CTS, message. This means that the CTS message according to the CS/LBT distributed MAC protocols, i.e. the RTS/CTS medium access protocol, may also be extended such that the UL MU-MIMO transmission capabilities of the first station STA 121 and the access point AP 110 may be utilized. This also means that the extended part of a CTS message may comprise the UL transmission rank which the first station STA 121 is to use for the UL transmission as determined by the access point AP 110 in Action 404 as described below. This means that the extended CTS message may be received by the first station STA 121 on a contention-based transmission resource in the wireless communications network 100.

In some embodiments, the first station STA 121 may also determine that no automatic deferment of the transmission of the message to the access point AP 110 is to be performed by the first station STA 121 in response to receiving other messages from the access point AP 110 designated to other stations 122, 123 in the wireless communications network 100. It may here be noted that this is not the case for conventional CTS messages according to the CS/LBT distributed MAC protocols, i.e. the RTS/CTS medium access protocol, i.e. deferment of the transmission is always performed when receiving CTS message intended for other stations in a wireless communication network in this case.

Furthermore, as for the transmitted message in Action 304, the contention-based transmission resources in the wireless communications network 100 over which the message from the access point AP 110 is received may be different than the ones over which an UL transmission from the first station STA 121 is transmitted to the access point AP 110. This means, for example, in case of using RTS/CTS messages and data frames, as illustrated e.g. in FIG. 5 below, that this CTS message will be transmitted over different transmission resources than the upcoming data frames. This may, for example, be performed so that the access point AP 110 does not need to receive uplink data frames and transmit the CTS message over the same transmission resource. In this case, the different contention-based transmission resources may, for example, be different frequencies, time slots, or codes.

Action 306

The first station STA 121 may also transmit, to the access point AP 110, an UL transmission on a contention-based transmission resource in the wireless communications network 100 using the indicated UL transmission rank received in the received message from the access point AP 110. This means that the first station STA 121 is able to decide when to transmit and how to properly configure its transmit parameters, in particular its transmission rank, for UL transmission on contention-bases transmissions resources.

Example of embodiments of a method performed by an access point AP 110 for enabling an Uplink, UL, transmission from a first station STA 121 in a wireless communications network 100 will now be described with reference to the flowchart depicted in FIG. 4. FIG. 4 is an illustrated example of actions or operations which may be taken by the access point AP 110 in the wireless communication network 100.

Action 401

In this action, the access point 111, for example, receive information from the first station STA 121 indicating that the first station STA 121 is capable of performing transmission rank adaptation for UL transmissions in the wireless communications network 100. This means that the access point AP 110 may be notified by the first station STA 121 that the first station STA 121 is capable of performing transmission rank adaptation for UL transmission. This enables the access point AP 110 to control if and when the first station STA 121 is to perform transmission rank adaptation for UL transmission.

Action 402

Optionally, e.g. in response to the received information in Action 401, the access point AP 110 may transmit information to the first station STA 121 indicating that the first station STA 121 is to perform transmission rank adaptation for UL transmissions in the wireless communications network 100. This means that the access point AP 110 may transmit a notification to the first station STA 121 that it should perform transmission rank adaptation for UL transmission. This may be performed directly by the access point AP 110 or as a response to the transmitted information in Action 401. Hence, the access point AP 110 may control if and when a first station STA 121 is to perform transmission rank adaptation for UL transmission.

Action 403

In this action, the access point AP 110 receives, from the first station STA 121, a message on a contention-based transmission resource in the wireless communications network 100 comprising information indicating a UL transmission rank for an UL transmission from the first station STA 121. In some embodiments, the message from the first station STA 121 may be an Request-to-Send, RTS, message. This means that the RTS message according to the CS/LBT distributed MAC protocols, i.e. the RTS/CTS medium access protocol, may be extended such that the UL MU-MIMO transmission capabilities of the first station STA 121 and the access point AP 110 may be utilized. The extended part of the RTS message may comprise the determined UL transmission rank determined by the first station STA 121 in Action 303 as described above. This means that the extended RTS message may be received by the access point AP 110 on a contention-based transmission resource in the wireless communications network 100.

In some embodiments, the contention-based transmission resources in the wireless communications network 100 over which the message from the first station STA 121 is received are different than the ones over which an UL transmission to the access point AP 110 is received. This means, for example, in case of using RTS/CTS messages and data frames, as illustrated e.g. in FIG. 5 below, that this RTS message will be transmitted over different transmission resources than the upcoming data frames. In this case, the different transmission resources may, for example, be different frequencies, time slots, or codes.

In some embodiments, the message received from the first station STA 121 may further comprise transmission information at the first station STA 121 associated with the number of antennas at the first station STA 121 which are available for transmitting an UL transmission to the access point AP 110, and wherein the UL transmission rank for an UL transmission from the first station STA 121 is determined further based on the received transmission information from the first station STA 121. In this case, the transmission information from the first station STA 121 may indicate the Degrees-of-Freedom, DoF, of the number of antennas at the first station STA 121 which are available for transmitting an UL transmission at the first station STA 121. In case the received message from the first station STA 121 is an RTS message, this also means that the extended part of a RTS message may further comprise this transmission information.

Action 404

After the reception in Action 403, the access point AP 110 determines an UL transmission rank for an UL transmission from the first station STA 121 based on at least the UL transmission rank received from the first station STA 121.

According to an illustrative example, the access point AP 110 may upon receiving the message from the first station STA 121, for example, record at least the transmission rank information in a rank adaptation table at the access point AP 110. The rank adaptation table may, for example, comprise: the identity of the first station STA 121 (e.g. a UE ID), the Degrees-of-Freedom, DoF, at the first station STA 121 (if this information was present in the message from the first station STA 121), and the suggested transmission rank by the first station STA 121. The rank adaptation table may also comprise similar entries for each of the stations, e.g. the second and third station STA 122, 123 in the wireless communication network 100, for which the access point AP 110 is able to perform UL MU MIMO transmission reception.

An example of such a rank adaptation table is shown in Table 1 below.

TABLE 1

| STA ID | STA DoF | Suggested Rank by STA | Decided Rank by AP |
|---|---|---|---|
| 121 | 2 | 2 | 2 |
| 122 | 4 | 4 | 2 |
| 123 | 1 | 1 | Under evaluation |

In this scenario, the first station 121 and the second station 122 have already been scheduled, while the access point AP 110 has just received the RTS message associated with the third station 123 and is currently evaluates the feasibility of scheduling the third station 123. Using for example a rank adaptation table as illustrated above, the access point AP 110 may determine whether or not any additional station may be scheduled for an UL transmission and which transmission rank it should use if scheduled. Thus, it may also be seen that, according to some embodiments, the UL transmission rank for an UL transmission from the first station STA 121 may be determined further based on one or more of: transmission information at the access point AP 110 associated with the number of antennas at the access point AP 110 that are available for receiving an UL transmission from the first station STA 121, and an aggregated currently used transmission rank by all stations 121, 122, 123 in UL transmissions to the access point AP 110. In this case, the transmission information at the access point AP 110 may indicate the Degrees-of-Freedom, DoF, of the number of antennas at the access point AP 110 which are available for receiving an UL transmission at the access point AP 110.

Action 405

After the determination in Action 404, the access point AP 110 transmits, to the first station STA 121, a message on a contention-based transmission resource in the wireless communications network 100 comprising information indicating the determined UL transmission rank. In some embodiments, the message to the first station STA 121 may be a Clear-to-Send, CTS, message. This means that the CTS message according to the CS/LBT distributed MAC protocols, i.e. the RTS/CTS medium access protocol, may also be extended such that the UL MU-MIMO transmission capabilities of the first station STA 121 and the access point AP 110 may be utilized. This also means that the extended part of the CTS message may comprise the UL transmission rank which the first station STA 121 is to use for the UL transmission as determined by the access point AP 110 in Action 404. This means that the extended CTS message may be transmitted by the access point AP 110 on a contention-based transmission resource in the wireless communications network 100.

In some embodiments, the contention-based transmission resources in the wireless communications network 100 over which the message from the access point AP 110 is transmitted are different than the ones over which an UL transmission to the access point AP 110 is received. This means, for example, in case of using RTS/CTS messages and data frames, as illustrated e.g. in FIG. 5 below, that this CTS message will be transmitted over different transmission resources than the upcoming data frames. This may, for example, be performed so that the CTS message do not interfere with any ongoing uplink data transmissions, and thus are easily detected at the first station STA 121. In this case, the different contention-based transmission resources may, for example, be different frequencies, time slots, or codes.

Action 406

The access point AP 110 may then receive, from the first station STA 121, the UL transmission on a contention-based transmission resource in the wireless communications network 100 in response to the transmitted message. This means that the capacity at the access point AP 110 will be increased since it will be able to receive transmissions from several stations simultaneously over the contention-based transmission resources.

Figure 5:
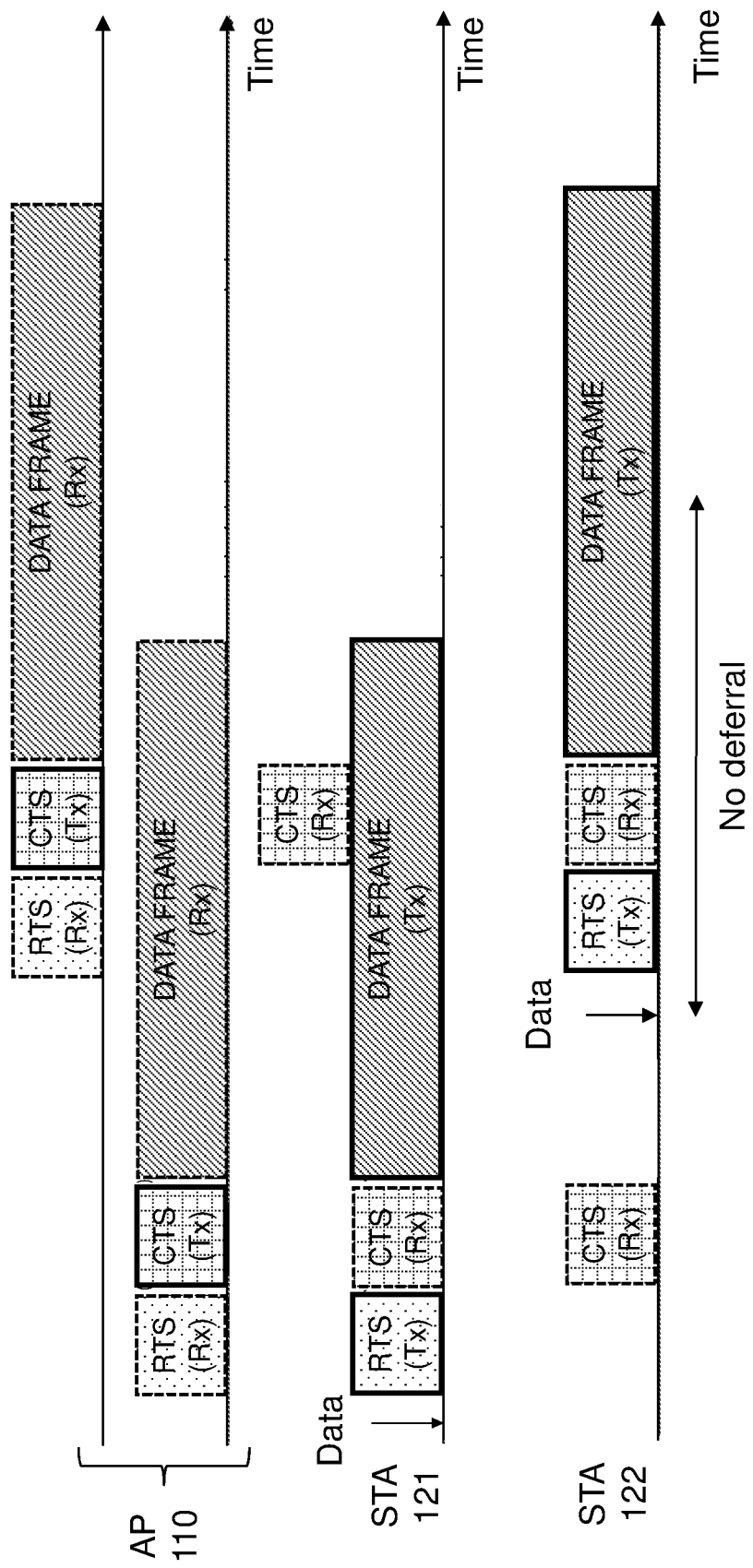
FIG. 5 is a schematic illustration of RTS/CTS signalling according to embodiments of a station and an access point.

FIG. 5 is a schematic illustration of an example of modified RTS/CTS signalling according to embodiments of the first station STA 121 and the access point AP 110.

According to the procedure, the first station STA 121 having data to transmit may first send an RTS message to the access point AP 110 in a first time slot. In response to the RTS message, the access point AP 110 sends a Clear-to-Send, CTS, message back to the first station STA 121 in a subsequent time slot. Since both the first station STA 121 and the second station STA 122 are constantly scanning the carrier medium for CTS messages, this CTS message may be received by both the first station STA 121 and a second station STA 122. Upon receiving the CTS message, the first station STA 121 may transmit its data to the access point AP 110 in following one or more time slots. So far, this procedure may be similar to the procedure according to the RTS/CTS medium access protocol as described with reference to FIG. 1 above.

However, the difference is here the meaning of the CTS message to the second station STA 122. With the modifications proposed herein according to some embodiments to the procedure of the RTS/CTS medium access protocol, the CTS message does not automatically imply that the second station STA 122 must defer from transmitting its data to the access point AP 110. Instead, the CTS message may, for example, simply be an indication to the first station STA 121 that it may go ahead and transmit the data frame, and with what transmission parameters, e.g. which transmission rank to use for the transmission of the data frame. Alternatively, the CTS message may comprise a data field indicating to the second station STA 122, and other stations that may receive the CTS message, for how long period of time it must defer from transmitting. However, this data field may be set to zero (0) if the receiver of the access point AP 110 estimates that the conditions permit the second station STA 122 to transmit. In this example, the second station STA 122 goes ahead and transmits its RTS message without delay from having data to transmit. The second station STA 122 then receives an CTS message from the access point AP 110 in response to the RTS message. Then, the second station STA 122 may transmit the data frame to the access point AP 110. The receiver in the access point AP 110 now simultaneously receives the data frames from the first station STA 121 and the second station STA 122 during parts of the time.

From a performance perspective, it should be noted that facilitating UL MU MIMO operation in this manner will reduce the expected transmission delay, for example, the delay of receiving the data frame from the second station STA 122 is reduced. It will also lead to increased capacity at the access point AP 110.

Figure 6B:
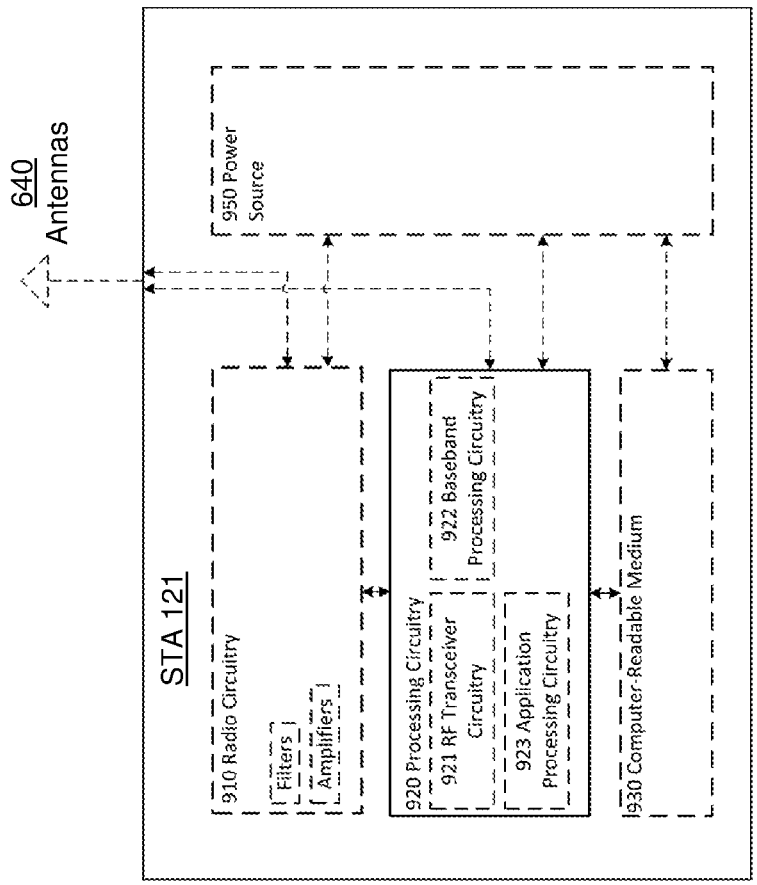
FIG. 6A-6B are block diagrams depicting embodiments of a station.
Figure 6A:
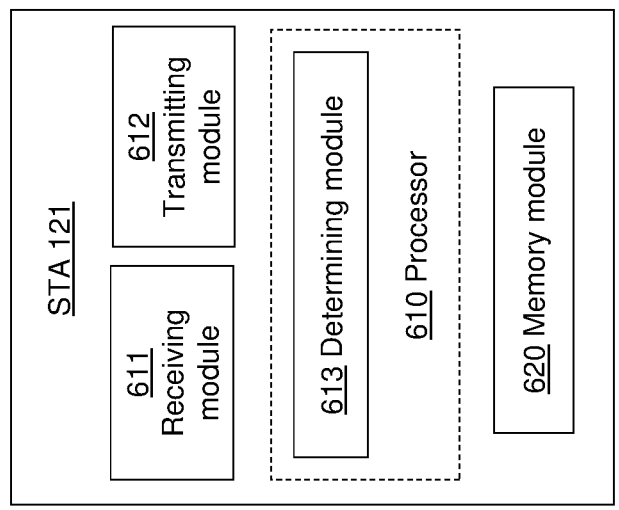

To perform the method actions in the first station STA 121 for enabling an Uplink, UL, transmission to an access point AP 110 in a wireless communications network 100, the first station STA 121 may comprise the following arrangement depicted in FIG. 6A. FIG. 6A shows a simplified schematic block diagram of embodiments of the first station STA 121. The embodiments of the first station STA 121 described herein may be considered as independent embodiments or may be considered in any combination with each other to describe non-limiting examples of the example embodiments described herein.

The first station STA 121 may comprise a processing circuitry 610, a memory 620 and one, two or more antennas (not shown). The processing circuitry 1010 may also comprise a receiving module 611 and a transmitting module 612. Alternative embodiments of the first station STA 121 may comprise additional components, such as, the determining module 613, responsible for providing its functionality necessary to support the embodiments described herein.

The first station STA 121 or processing circuitry 610 is configured to, or may comprise the determining module 613 configured to, determine a UL transmission rank for an UL transmission to the access point AP 110. In some embodiments, the determined UL transmission rank is based on at least Channel State Information, CSI, estimated from reference signals received from the access point AP 110 and transmission information at the first station STA 121 associated with the number of antennas at the first station STA 121 which are available for transmitting an UL transmission to the access point AP 110.

Also, the first station STA 121 or processing circuitry 610 is configured to, or may comprise the transmitting module 612 configured to, transmit to the access point 110 a message on a contention-based transmission resource in the wireless communications network 100 comprising information indicating the determined UL transmission rank. According to some embodiments, the message to the access point AP 110 further comprises the transmission information at the first station STA 121. Here, the transmission information at the first station STA 121 may indicate the Degrees-of-Freedom, DoF, of the number of antennas at the first station STA 121 which are available for transmitting an UL transmission to the access point AP 110. In some embodiments, the message to the access point AP 110 may be an Request-to-Send, RTS, message.

In some embodiments, the first station STA 121 or processing circuitry 610 may be configured to, or may comprise the receiving module 611 configured to, receive, from the access point AP 110, a message on a contention-based transmission resource in the wireless communications network 100 comprising information indicating a UL transmission rank to be used by the first station STA 121 in an UL transmission. Here, the message from the access point AP 110 may be an Clear-to-Send, CTS, message.

Further, in some embodiments, the first station STA 121 or processing circuitry 610 is configured to, or may comprise the transmitting module 612 configured to, transmit, to the access point AP 110, an UL transmission on a contention-based transmission resource in the wireless communications network 100 using the UL transmission rank received in the received message from the access point AP 110.

In some embodiments, the first station STA 121 or processing circuitry 610 may be configured to, or may comprise the determining module 613 configured to, determine that no automatic deferment of the transmission of the message to the access point AP 110 is to be performed by the first station STA 121 in response to receiving other messages from the access point AP 110 designated to other stations, such as, e.g. the second and third stations STA 122, 123, in the wireless communications network 100.

In some embodiments, the contention-based transmission resources in the wireless communications network 100 over which the messages are transmitted are different than the ones over which an UL transmission from the first station STA 121 is transmitted to the access point AP 110. Here, the different contention-based transmission resources may be a different frequencies, time slots, or codes.

According to some embodiments, the first station STA 121 or processing circuitry 610 may be configured to, or may comprise the transmitting module 612 configured to, transmit information to the access point AP 110 indicating that the first station STA 121 is capable of performing transmission rank adaptation for UL transmissions in the wireless communications network 100. Furthermore, in some embodiments, the first station STA 121 or processing circuitry 610 may be configured to, or may comprise the receiving module 611 configured to, receive information from the access point AP 110 indicating that the first station STA 121 is to perform transmission rank adaptation for UL transmissions in the wireless communications network 100.

Furthermore, the embodiments for enabling an Uplink, UL, transmission to an access point AP 110 in a wireless communications network 100 described above may be implemented through one or more processors, such as the processing circuitry 610 in the first station STA 121 depicted in FIG. 6A, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 610 in the first station STA 121. The computer program code may e.g. be provided as pure program code in the first station STA 121 or on a server and downloaded to the first station STA 121. Thus, it should be noted that the modules of the first station STA 121 may in some embodiments be implemented as computer programs stored in memory, e.g. in the memory modules 620 in FIG. 6A, for execution by processors or processing modules, e.g. the processing circuitry 610 of FIG. 6A.

Those skilled in the art will also appreciate that the processing circuitry 610 and the memory 620 described above may refer to a combination of analog and digital circuits, and/or one or more processors configured with software and/or firmware, e.g. stored in a memory, that when executed by the one or more processors such as the processing circuitry 620 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Other more detailed and alternative configurations of the same embodiments of the first station STA 121 providing the same functionality as described above with reference to FIG. 6A are shown in relation to FIG. 6B. As shown in FIG. 6B, the example first station STA 121 includes an antenna 940, radio circuitry (e.g. radio front-end circuitry) 910, processing circuitry 920, and the first station STA 121 may also include a memory 930. The memory 930 may be separate from the processing circuitry 920 or an integral part of processing circuitry 920. Antennas 940 may include one or more antennas or antenna arrays, and is configured to send and/or receive wireless signals, and is connected to radio circuitry (e.g. radio front-end circuitry) 910. In certain alternative embodiments, first station STA 121 may not include antenna 940, and antennas 940 may instead be separate from first station STA 121 and be connectable to first station STA 121 through an interface or port.

The radio circuitry (e.g. radio front-end circuitry) 910 may comprise various filters and amplifiers, is connected to antennas 940 and processing circuitry 920, and is configured to condition signals communicated between antennas 940 and processing circuitry 920. In certain alternative embodiments, first station STA 121 may not include radio circuitry (e.g. radio front-end circuitry) 910, and processing circuitry 920 may instead be connected to antenna 940 without front-end circuitry 910.

Processing circuitry 920 may include one or more of radio frequency (RF) transceiver circuitry, baseband processing circuitry, and application processing circuitry. In some embodiments, the RF transceiver circuitry 921, baseband processing circuitry 922, and application processing circuitry 923 may be on separate chipsets. In alternative embodiments, part or all of the baseband processing circuitry 922 and application processing circuitry 923 may be combined into one chipset, and the RF transceiver circuitry 921 may be on a separate chipset. In still alternative embodiments, part or all of the RF transceiver circuitry 921 and baseband processing circuitry 922 may be on the same chipset, and the application processing circuitry 923 may be on a separate chipset. In yet other alternative embodiments, part or all of the RF transceiver circuitry 921, baseband processing circuitry 922, and application processing circuitry 923 may be combined in the same chipset. Processing circuitry 920 may include, for example, one or more central processing units (CPUs), one or more microprocessors, one or more application specific integrated circuits (ASICs), and/or one or more field programmable gate arrays (FPGAs).

The first station STA 121 may include a power source 950. The power source 950 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 910, processing circuitry 920, and/or memory 930. The power source 950, battery, power supply circuitry, and/or power management circuitry are configured to supply first station STA 121, including processing circuitry 920, with power for performing the functionality described herein.

Figures 7A, 7B:
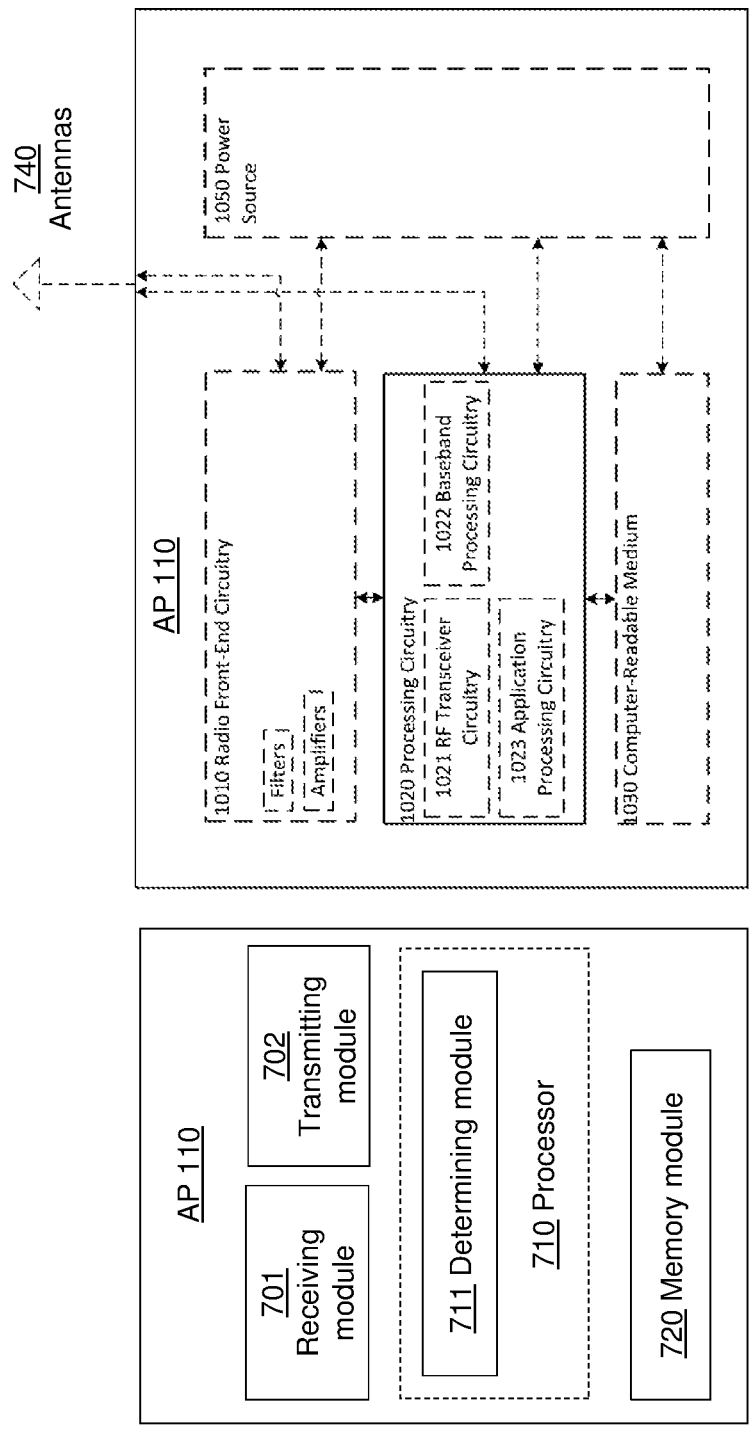
FIG. 7A-7B are block diagrams depicting embodiments of an access point, FIG. 8 schematically illustrates a telecommunication network connected via an intermediate network to a host computer.

To perform the method actions in the access point AP 110 for enabling an Uplink, UL, transmission from a first station STA 121 in a wireless communications network 100, the access point AP 110 may comprise the following arrangement depicted in FIG. 7A. FIG. 7A shows a simplified schematic block diagram of embodiments of the access point AP 110. The embodiments of the access point AP 110 described herein may be considered as independent embodiments or may be considered in any combination with each other to describe non-limiting examples of the example embodiments described herein.

The access point AP 110 may comprise a processing circuitry 710, a memory 720 and one, two or more antennas (not shown). The processing circuitry 1010 may also comprise a receiving module 711 and a transmitting module 712. Alternative embodiments of the access point AP 110 may comprise additional components, such as, the determining module 713, responsible for providing its functionality necessary to support the embodiments described herein.

The access point AP 110 or processing circuitry 710 is configured to, or may comprise the receiving module 713 configured to, receive, from the first station STA 121, a message on a contention-based transmission resource in the wireless communications network 100 comprising information indicating a UL transmission rank for an UL transmission from the first station STA 121. In some embodiments, the message received from the first station STA 121 may further comprise transmission information at the first station STA 121 associated with the number of antennas at the first station STA 121 which are available for transmitting an UL transmission to the access point AP 110, and wherein the UL transmission rank for an UL transmission from the first station STA 121 is determined further based on the received transmission information from the first station STA 121. Here, the transmission information from the first station STA 121 indicates the Degrees-of-Freedom, DoF, of the number of antennas at the first station STA 121 which are available for transmitting an UL transmission at the first station STA 121. Also, in some embodiments, the message from the first station STA 121 may be a Request-to-Send, RTS, message.

Also, the access point AP 110 or processing circuitry 710 is configured to, or may comprise the determining module 713 configured to, determine an UL transmission rank for an UL transmission from the first station STA 121 based on at least the UL transmission rank received from the first station STA 121. In some embodiments, the UL transmission rank for an UL transmission from the first station STA 121 is determined further based on one or more of: transmission information at the access point AP 110 associated with the number of antennas at the access point AP 110 that are available for receiving an UL transmission from the first station STA 121, and an aggregated currently used transmission rank by all stations 121, 122, 123 in UL transmissions to the access point AP 110. Here, the transmission information at the access point AP 110 may indicate the Degrees-of-Freedom, DoF, of the number of antennas at the access point AP 110 which are available for receiving an UL transmission at the access point AP 110.

Further, the access point AP 110 or processing circuitry 710 is configured to, or may comprise the transmitting module 712 configured to, transmit a message to the first station STA 121 comprising information indicating the determined UL transmission rank. Here, according to some embodiments, the message to the first station STA 121 is an Clear-to-Send, CTS, message.

In some embodiments, the access point AP 110 or processing circuitry 710 is configured to, or may comprise the receiving module 713 configured to, receive, from the first station STA 121, the UL transmission on a contention-based transmission resource in the wireless communications network 100 in response to the transmitted message.

Further, in some embodiments, the contention-based transmission resources in the wireless communications network 100 over which the messages are transmitted are different than the ones over which an UL transmission to the access point AP 110 is transmitted. In this case, the different contention-based transmission resources may be different frequencies, time slots, or codes.

According to some embodiments, the access point AP 110 or processing circuitry 710 may be configured to, or may comprise the receiving module 711 configured to, receive information from the first station STA 121 indicating that the first station STA 121 is capable of performing transmission rank adaptation for UL transmissions in the wireless communications network 100. Furthermore, in some embodiments, the access point AP 110 or processing circuitry 710 may be configured to, or may comprise the transmitting module 712 configured to, transmit information to the first station STA 121 indicating that the first station STA 121 is to perform transmission rank adaptation for UL transmissions in the wireless communications network 100.

Furthermore, the embodiments for enabling an Uplink, UL, transmission from a first station STA 121 in a wireless communications network 100 described above may be implemented through one or more processors, such as the processing circuitry 710 in the access point AP 110 depicted in FIG. 7A, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the access point AP 110. The computer program code may e.g. be provided as pure program code in the access point AP 110 or on a server and downloaded to the access point AP 110. Thus, it should be noted that the modules of the access point AP 110 may in some embodiments be implemented as computer programs stored in memory, e.g. in the memory modules 720 in FIG. 7A, for execution by processors or processing modules, e.g. the processing circuitry 710 of FIG. 7A.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 720 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Other more detailed and alternative configurations of the same embodiments of the access point AP 110 providing the same functionality as described above with reference to FIG. 7A are shown in relation to FIG. 7B. As shown in FIG. 7B, the example access point AP 110 includes an antenna 1040, radio circuitry (e.g. radio front-end circuitry) 1010, processing circuitry 1020, and the access point AP 110 may also include a memory 1030. The memory 1030 may be separate from the processing circuitry 1020 or an integral part of processing circuitry 1020. Antenna 1040 may include one or more antennas or antenna arrays, and is configured to send and/or receive wireless signals, and is connected to radio circuitry (e.g. radio front-end circuitry) 1010. In certain alternative embodiments, access point AP 110 may not include antenna 1040, and antenna 1040 may instead be separate from access point AP 110 and be connectable to access point AP 110 through an interface or port.

The radio circuitry (e.g. radio front-end circuitry) 1010 may comprise various filters and amplifiers, is connected to antenna 1040 and processing circuitry 1020, and is configured to condition signals communicated between antenna 1040 and processing circuitry 1020. In certain alternative embodiments, access point AP 110 may not include radio circuitry (e.g. radio front-end circuitry) 1010, and processing circuitry 1020 may instead be connected to antenna 1040 without front-end circuitry 1010.

Processing circuitry 1020 may include one or more of radio frequency (RF) transceiver circuitry, baseband processing circuitry, and application processing circuitry. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

The access point AP 110 may include a power source 1050. The power source 1050 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1010, processing circuitry 1020, and/or memory 1030. The power source 1050, battery, power supply circuitry, and/or power management circuitry are configured to supply access point AP 110, including processing circuitry 1020, with power for performing the functionality described herein.

Further Aspects

According to a first additional aspect of the embodiments described herein, it is also presented a communication system including a host computer comprising: a communication interface configured to receive user data originating from a transmission from a user equipment (UE) to a base station, wherein the UE comprises a radio interface and processing circuitry, the UE's processing circuitry configured to: determine an UL transmission rank for an UL transmission to the base station, and transmit a message to the base station comprising information indicating the determined UL transmission rank. The communication system may further include the UE. The communication system may further include the base station, wherein the base station comprises a radio interface configured to communicate with the UE and a communication interface configured to forward to the host computer the user data carried by a transmission from the UE to the base station. A communication system described above, wherein: the processing circuitry of the host computer is configured to execute a host application; and the UE's processing circuitry is configured to execute a client application associated with the host application, thereby providing the user data may also be provided. A communication system described above, wherein: the processing circuitry of the host computer is configured to execute a host application, thereby providing request data; and the UE's processing circuitry is configured to execute a client application associated with the host application, thereby providing the user data in response to the request data may also be provided.

According to a second additional aspect of the embodiments described herein, it is also presented a method implemented in a communication system including a host computer, a base station and a user equipment (UE), the method comprising: at the host computer, receiving user data transmitted to the base station from the UE, wherein the UE determine an UL transmission rank for an UL transmission to the base station, and transmit a message to the base station comprising information indicating the determined UL transmission rank. The method may further comprise: at the UE, providing the user data to the base station. The method may further comprise: at the UE, executing a client application, thereby providing the user data to be transmitted; and at the host computer, executing a host application associated with the client application. The method may further comprise: at the UE, executing a client application; and at the UE, receiving input data to the client application, the input data being provided at the host computer by executing a host application associated with the client application, wherein the user data to be transmitted is provided by the client application in response to the input data.

According to a third additional aspect of the embodiments described herein, it is also presented a communication system including a host computer comprising a communication interface configured to receive user data originating from a transmission from a user equipment (UE) to a base station, wherein the base station comprises a radio interface and processing circuitry, the base station's processing circuitry configured to: receive a message from the station comprising information indicating a UL transmission rank for an UL transmission from the station, determine an UL transmission rank for an UL transmission from the station based on at least the UL transmission rank received from the station, and transmit a message to the station comprising information indicating the determined UL transmission rank. The communication system may further include the base station. The communication system may further include the UE, wherein the UE is configured to communicate with the base station. A communication system described above, wherein: the processing circuitry of the host computer is configured to execute a host application; the UE is configured to execute a client application associated with the host application, thereby providing the user data to be received by the host computer is also provided.

According to a fourth additional aspect of the embodiments described herein, it is also presented a method implemented in a communication system including a host computer, a base station and a user equipment (UE), the method comprising: at the host computer, receiving, from the base station, user data originating from a transmission which the base station has received from the UE, wherein the base station receive a message from the station comprising information indicating a UL transmission rank for an UL transmission from the station, determine an UL transmission rank for an UL transmission from the station based on at least the UL transmission rank received from the station, and transmit a message to the station comprising information indicating the determined UL transmission rank. The method may further comprise: at the base station, receiving the user data from the UE. The method may further comprise: at the base station, initiating a transmission of the received user data to the host computer.

Figure 8:
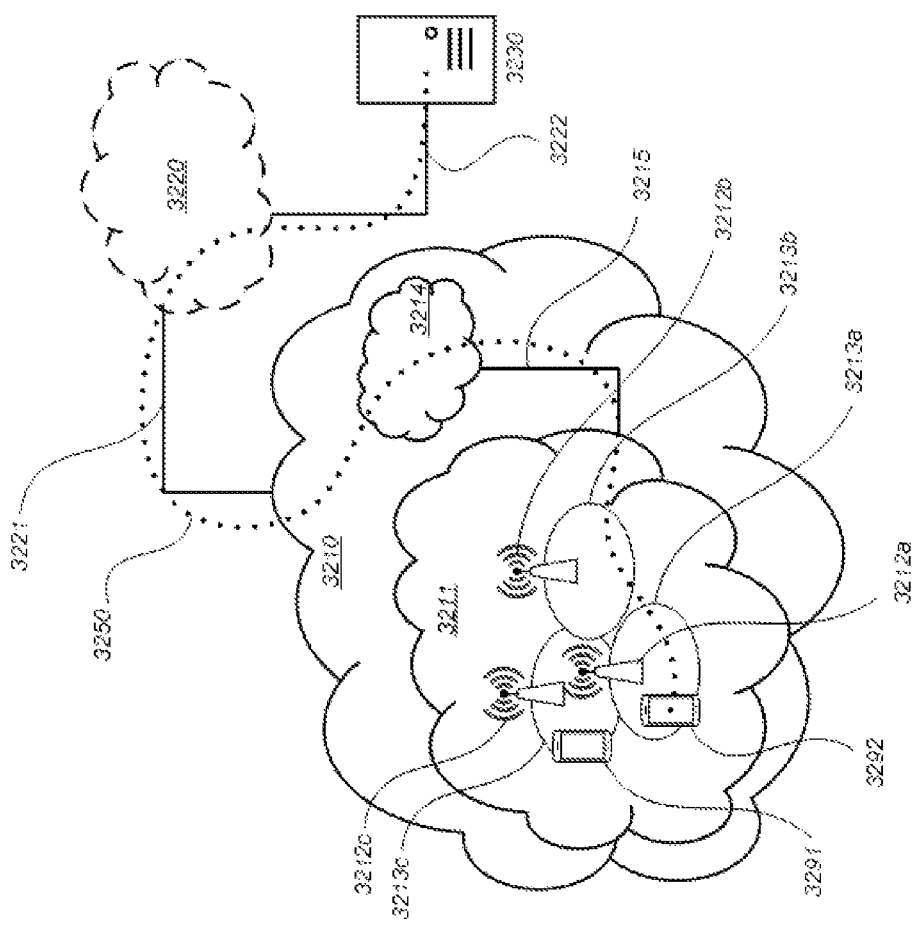

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
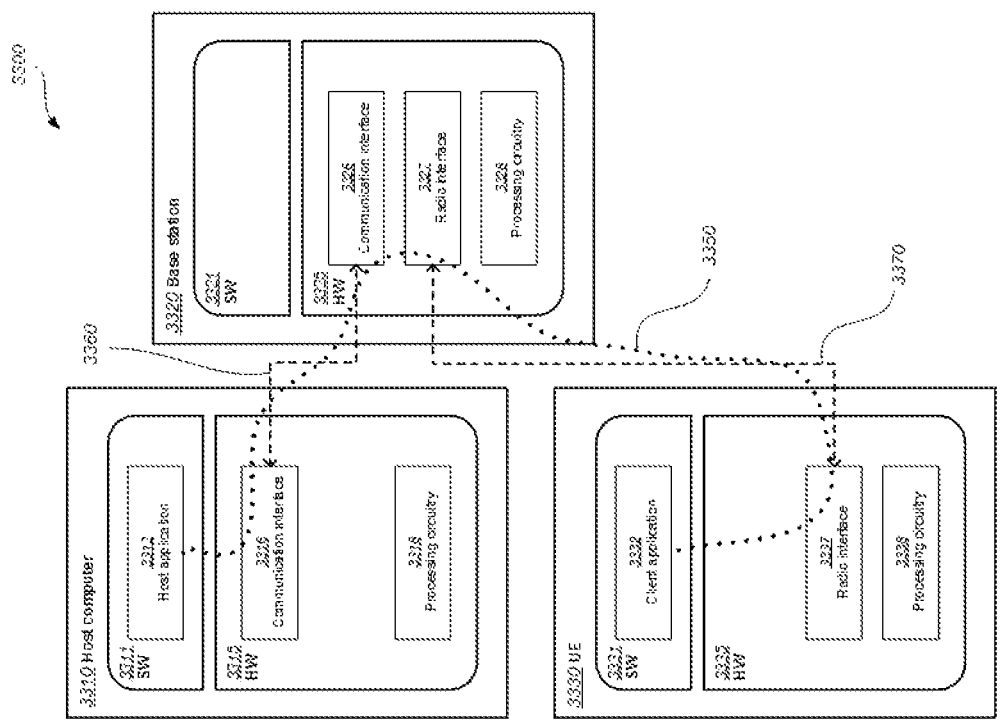
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve UL MU MIMO operations in the unlicensed frequency band, i.e. on contention-based transmission resources, and thereby provide benefits such as higher bit-rates and low latencies.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

AP Access Point
BS Base Station
CSI Channel State Information
CSIR Channel State Information at the Receiver
CSIT Channel State Information at the Transmitter
LAA Licensed Assisted Access
LBT Listen before Talk
MAC Medium Access Control
MU-MIMO Multi-User Multiple Input Multiple Output
NW Network
QoS Quality of Service
RA Resource Allocation
RAN Radio Access Network
RRM Radio Resource Management
SNR Signal-to-Noise Ratio
SINR Signal to Interference plus Noise Ratio
UE User Equipment
UL Uplink

The invention claimed is:

1. A method performed by a station for enabling an Uplink, UL, transmission to an access point in a wireless communications network, the method comprising:
   determining a UL transmission rank for an UL transmission to the access point;
   transmitting, to the access point, a message on a contention-based transmission resource in the wireless communications network comprising information indicating the determined UL transmission rank; and
   transmitting information to the access point indicating that the station performs transmission rank adaptation for UL transmissions in the wireless communications network.

2. The method according to claim 1, further comprising:
   receiving, from the access point, a message on a contention-based transmission resource in the wireless communications network comprising information indicating a UL transmission rank to be used by the station in an UL transmission, and
   transmitting, to the access point, an UL transmission on a contention-based transmission resource in the wireless communications network-using the indicated UL transmission rank received in the received message from the access point.

3. The method according to claim 1, wherein the determined UL transmission rank is based on at least Channel State Information, CSI, estimated from reference signals received from the access point and transmission information at the station associated with the number of antennas at the station which are available for transmitting an UL transmission to the access point, wherein the message to the access point further comprises the transmission information at the station.

4. The method according to claim 3, wherein the transmission information at the station indicates the Degrees-of-Freedom, DoF, of the number of antennas at the station which are available for transmitting an UL transmission to the access point.

5. The method according to claim 1, further comprising determining that deferment of the transmission of the message to the access point is to be performed by the station in response to receiving other messages from the access point designated to other stations in the wireless communications network.

6. The method according to claim 1, wherein the contention-based transmission resources in the wireless communications network over which the messages are transmitted are different than the ones over which an UL transmission from the station is transmitted to the access point, and wherein the different contention-based transmission resources may be a different frequencies, time slots, or codes.

7. The method according to claim 1, wherein the message to the access point is an Request-to-Send, RTS, message, and the message from the access point is an Clear-to-Send, CTS, message.

8. The method according to claim 1, further comprising:
receiving information from the access point indicating that the station is to perform transmission rank adaptation for UL transmissions in the wireless communications network.

9. A station for enabling an Uplink, UL, transmission to an access point in a wireless communications network, the station comprising radio circuitry that is configured to:
determine a UL transmission rank for an UL transmission to the access point, and transmit, to the access point, a message on a contention-based transmission resource in the wireless communications network comprising information indicating the determined UL transmission rank; and
transmit information to the access point indicating that the station performs transmission rank adaptation for UL transmissions in the wireless communications network.

10. The station according to claim 9, wherein the radio circuitry is further configured to, from the access point, a message on a contention-based transmission resource in the wireless communications network comprising information indicating a UL transmission rank to be used by the station in an UL transmission.

11. The station according to claim 10, wherein the radio circuitry is further configured to transmit, to the access point, an UL transmission on a contention-based transmission resource in the wireless communications network using the indicated UL transmission rank received in the received message from the access point.

12. A method performed by a station for enabling an Uplink, UL, transmission to an access point in a wireless communications network, the method comprising:
determining a UL transmission rank for an UL transmission to the access point; and
transmitting, to the access point, a message on a contention-based transmission resource in the wireless communications network comprising information indicating the determined UL transmission rank; and
receiving information from the access point indicating that the station is to perform transmission rank adaptation for UL transmissions in the wireless communications network.

13. The method according to claim 12, further comprising:
receiving, from the access point, a message on a contention-based transmission resource in the wireless communications network comprising information indicating a UL transmission rank to be used by the station in an UL transmission, and
transmitting, to the access point, an UL transmission on a contention-based transmission resource in the wireless communications network-using the indicated UL transmission rank received in the received message from the access point.

14. The method according to claim 12, wherein the determined UL transmission rank is based on at least Channel State Information, CSI, estimated from reference signals received from the access point and transmission information at the station associated with the number of antennas at the station which are available for transmitting an UL transmission to the access point, wherein the message to the access point further comprises the transmission information at the station.

15. The method according to claim 14, wherein the transmission information at the station indicates the Degrees-of-Freedom, DoF, of the number of antennas at the station which are available for transmitting an UL transmission to the access point.

16. The method according to claim 12, further comprising determining that deferment of the transmission of the message to the access point is to be performed by the station in response to receiving other messages from the access point designated to other stations in the wireless communications network.

17. The method according to claim 12, wherein the contention-based transmission resources in the wireless communications network over which the messages are transmitted are different than the ones over which an UL transmission from the station is transmitted to the access point, and wherein the different contention-based transmission resources may be a different frequencies, time slots, or codes.

18. The method according to claim 12, wherein the message to the access point is an Request-to-Send, RTS, message, and the message from the access point is an Clear-to-Send, CTS, message.

19. The method according to claim 12, further comprising:
transmitting information to the access point indicating that the station performs transmission rank adaptation for UL transmissions in the wireless communications network.

20. A station for enabling an Uplink, UL, transmission to an access point in a wireless communications network, the station comprising radio circuitry that is configured to:
determine a UL transmission rank for an UL transmission to the access point, and transmit, to the access point, a message on a contention-based transmission resource in the wireless communications network comprising information indicating the determined UL transmission rank; and
receive information from the access point indicating that the station is to perform transmission rank adaptation for UL transmissions in the wireless communications network.

21. The station according to claim 20, wherein the radio circuitry is further configured to, from the access point, a message on a contention-based transmission resource in the wireless communications network comprising information indicating a UL transmission rank to be used by the station in an UL transmission.

22. The station according to claim 21, wherein the radio circuitry is further configured to transmit, to the access point, an UL transmission on a contention-based transmission resource in the wireless communications network using the indicated UL transmission rank received in the received message from the access point.

* * * * *